United States Patent [19]

Lim

[11] 3,711,730

[45] Jan. 16, 1973

[54] UNIVERSAL ACTIVE LATTICE NETWORK

[75] Inventor: Koang Eng Lim, Ottawa, Ontario, Canada

[73] Assignee: Northern Electric Company Limited, Quebec, Canada

[22] Filed: Nov. 9, 1971

[21] Appl. No.: 196,920

[52] U.S. Cl. ................................307/295, 330/30 R

[51] Int. Cl. ............................................H03k 1/16

[58] Field of Search........307/295; 328/167; 330/21, 330/30, 330/30 D, 31, 124 R; 333/74–75

[56] References Cited

UNITED STATES PATENTS

| | | | |
|---|---|---|---|
| 3,593,164 | 7/1971 | Newbold | 307/295 |
| 3,344,283 | 9/1967 | Stubbs | 307/295 |
| 3,231,824 | 1/1966 | Drapkin | 307/295 |
| 3,508,075 | 4/1970 | Savage | 307/295 |
| 3,532,908 | 10/1970 | Jennings | 307/295 |
| 3,450,899 | 6/1969 | Knight | 307/295 |
| 3,187,195 | 6/1965 | Stefanov | 307/295 |
| 3,286,168 | 11/1966 | Schmidt | 307/295 |
| 3,422,283 | 1/1969 | Murray | 307/289 |

OTHER PUBLICATIONS

Strahan "Op Amp Control Without Relays" pages 41 & 42, EDN/EEE Aug. 15, 1971.

Tenny "The Operational Amplifier" pages 30 to 40, Popular Electronics, Vol. 35, No. 2, Aug. 1971.

*Primary Examiner*—H. K. Saalbach
*Assistant Examiner*—R. E. Hart
*Attorney*—John E. Mowle

[57] ABSTRACT

The invention provides an active lattice network which may be used in place of a passive lattice network of any order. There is provided a differential amplifier having a pair of input ports and a pair of output ports. Each of the input ports is connected to the same input terminal through a respective resistance element corresponding to the terminating resistance of the network and to a common terminal through a respective impedance element having predetermined characteristics. The output of the network may be obtained either from the pair of output ports or from one of the output ports and the common terminal.

4 Claims, 2 Drawing Figures

UNIVERSAL ACTIVE LATTICE NETWORK

This invention relates generally to lattice networks and more particularly to the realization of a universal active lattice network using a differential amplifier.

Lattice networks may be used for generating single sideband signals by the method of quadrature modulation. In such a system it is necessary to produce two versions of the signal which are mutually in quadrature. The two versions can be produced by passing the original signal through two parallel all-pass networks which have phase characteristics which differ by substantially 90° over the required band of frequencies. The transfer functions for such all-pass network pairs are well known and may be found in any textbook on filter networks. All-pass networks are also of interest for equalizing the phase characteristics of other filters which have prescribed amplitude/frequency responses.

Passive lattice networks suffer from a major disadvantage in that their structure is that of a Wheatstone bridge and is therefore very sensitive to mismatches among the four arms of the lattice. In the past, attempts at solving this problem have been made by designing active all-pass filters of a constant-resistance type using a differential operational amplifier. However, those circuits can only be used to realize all-pass filters of a first order. If higher order filters are required, the circuits must be cascaded using isolation stages. In addition, the existing circuits only provide for an unbalanced output.

The present invention solves the problems associated with a passive lattice network by providing an active lattice network which may be used to realize networks of any order. Also, the impedance elements of the network may be of any complexity and the networks may have any frequency response with amplitude, delay or phase. Furthermore, the circuit of the invention has the added advantages of universality low cost, small size and it uses only one-half the number of impedance elements normally used in a passive lattice filter network.

In accordance with the invention, there is provided an active lattice network comprising a differential amplifier having a pair of input ports and a pair of output ports. Each of the input ports is connected to the same input terminal through a respective resistance element corresponding to the terminating resistance of the network and to a common terminal through a respective impedance element having predetermined characteristics. The output of the network may be obtained either from the pair of output ports or from one of the output ports and the common terminal.

The concept of the invention will now be described in conjunction with the drawings, in which.

Throughout the drawings, like numerals are used to identify like elements of the circuits.

Figure 1:
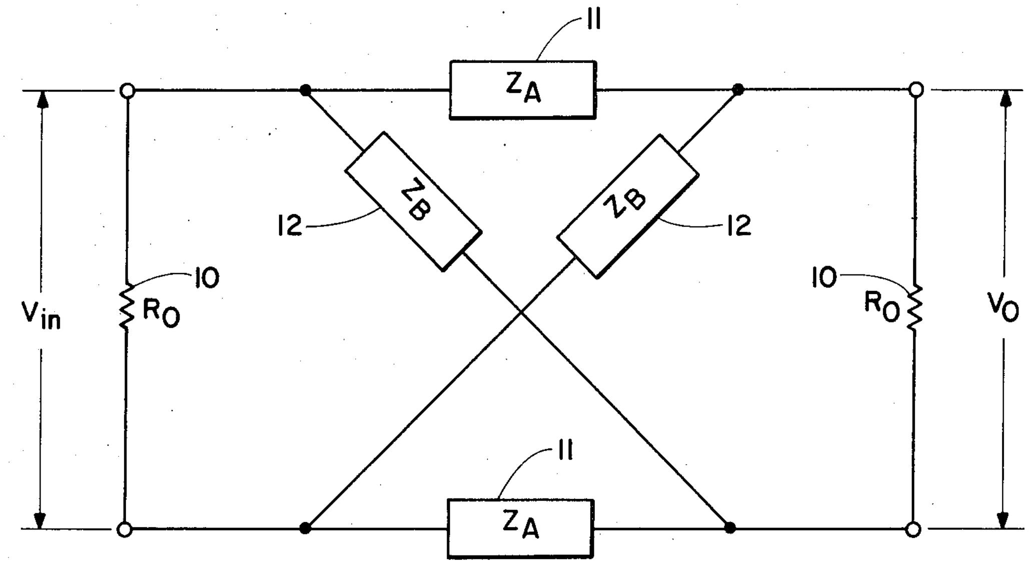
Fig. 1 (PRIOR ART)
FIG. 1 is a circuit representation of a passive lattice network.

FIG. 1 of the drawings shows a standard passive all-pass lattice network. A first pair of matched impedance elements 11 are connected in series with a pair of resistance elements 10, each corresponding to the terminating resistance of the network. A second pair of matched impedance elements 12 are cross-connected between the impedance elements 11 and the resistance elements 10. As is generally known, the voltage transfer function of a standard passive lattice network is:

$$(V_o/V_{in}) = \tfrac{1}{2}\,[(Z_a)/(R_o+Z_a) - (Z_b)/(R_o+Z_b)] \quad \text{Eq. (1)}$$

Figure 2:
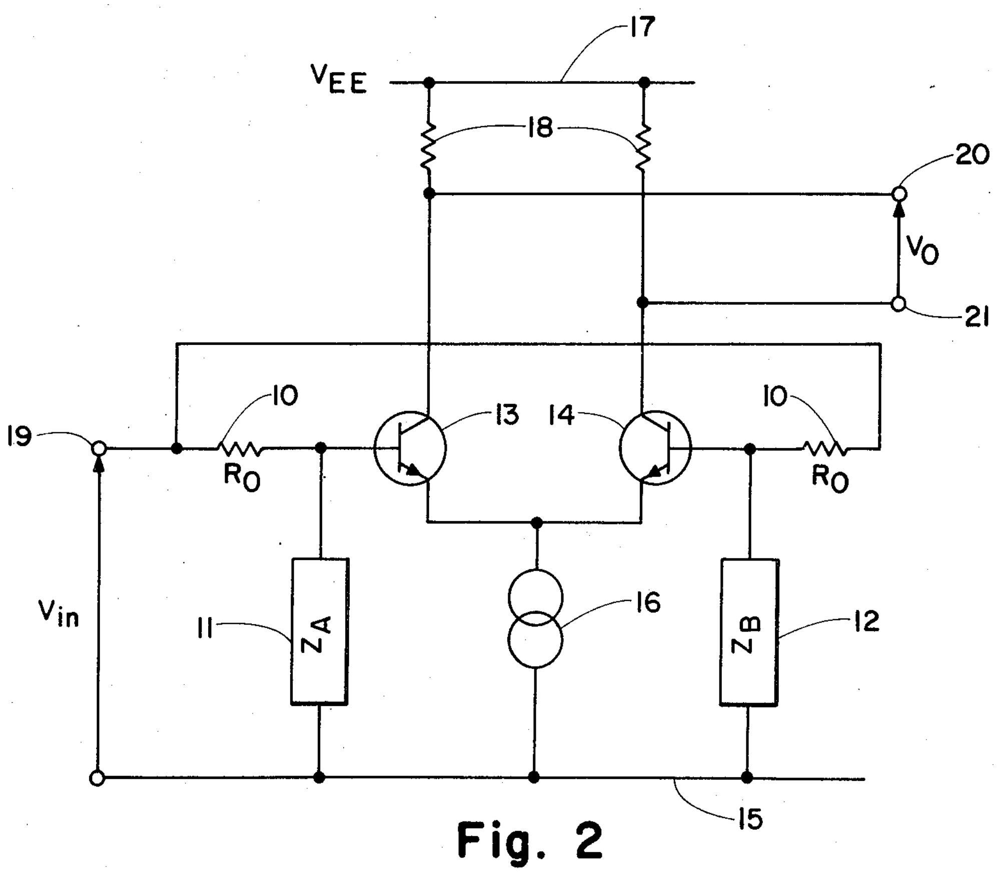
FIG. 2 is an active lattice network in accordance with the invention.

FIG. 2 of the drawings shows an active lattice network in accordance with the invention. A pair of transistors 13 and 14 have emitter, base and collector electrodes. The emitter electrodes of the transistors 13 and 14 are connected together and to a common terminal 15 through a constant current source 16. Current source 16 may simply be a resistor or preferably, a transistor circuit. The collector electrodes of the transistors 13 and 14 are connected to a source of voltage 17 through respective resistors 18. The base electrode of transistor 13 is connected to an input terminal 19 through a resistance element 10 corresponding to the terminating resistance of the network and to the common terminal 15 through an impedance element 11 having predetermined characteristics. Similarly, the base electrode of transistor 14 is connected to the input terminal 19 through a resistance element 10 also corresponding to the terminating resistance of the network and to the common terminal 15 through an impedance element 12 having predetermined characteristics. Impedance elements 11 and 12 correspond to similarly numbered elements in the circuit of FIG. 1 and may assume any complexity as they would for a passive lattice network. As may be observed, elements 11 and 12 in FIG. 2 are dissimilar and therefore do not require to be matched. The collector electrodes of transistors 13 and 14 are connected to output terminals 20 and 21 respectively.

Mathematical Considerations

Assuming an input voltage $V_{in}$ appearing across the input terminal 19 and the common terminal 15, the voltage appearing at the base electrode of transistor 13 is:

$$(V_{in}Z_a)/(R_o+Z_a)$$

Similarly, the voltage appearing at the base electrode of transistor 14 is:

$$(V_{in}Z_b)/(R_o+Z_b)$$

The differential output voltage $V_o$ appearing across output terminals 20 and 21 is:

$$(V_o/V_{in}) = K\,[(Z_a)/(R_o+Z_a) - (Z_b)/(R_o+Z_b)] \quad \text{Eq. (2)}$$

where K is the constant of the amplifier.

As may be observed, equation 2 is identical in form to equation 1. Therefore, the circuit of FIG. 2 is capable of performing the function of the circuit of FIG. 1.

Equation 2 may be further reduced to:

$$(V_o/V_{in}) = K\,[Z'_a/1+Z'_a - Z'_b/1+Z'_b]$$

and $$(V_o/V_{in}) = K\,[(Z'_a - Z'_b)/(1+Z'_a)\,(1+Z'_b)] \quad \text{Eq. (3)}$$

where $Z'_a$ and $Z'_b$ are the normalized impedances of $Z_a$ and $Z_b$ with respect to $R_o$.

If a constant impedance network is required, $Z'_a \cdot Z'_b = 1$ and equation 3 reduces to $$(V_o/V_{in}) = K\,[Z'_a - 1/Z'_a + 1] \text{ or } (V_o/V_{in}) = K\,[(1-Z'_b)/(1+Z'_b)]$$

This is the voltage transfer function for a constant impedance lattice network. Therefore, to convert the circuit of FIG. 2 to that of a constant impedance network, it is only necessary to make $R_o = Z'_b = 1$ or $R_o = Z'_a = 1$.

For ideal operation of the network of FIG. 2, the input impedance looking into the amplifier should be infinite. This condition is easily approached since the input impedance of a differential amplifier is inherently high. However, if a higher input impedance is desired, red, a Darlington pair input may be incorporated in the circuit. Alternatively, the effects of a finite impedance can be compensated by increasing the value of $R_o$.

It should be noted that the output voltage across the output terminals 20 and 21 is balanced. If an unbalanced output is desired, the output of the network may be taken across the common terminal 15 and one of the output terminals 20 and 21.

Therefore, any lattice network such as delay, phase-difference or filter may be converted into an equivalent active network using the circuit of FIG. 2. Such conversion reduces the number of required impedance elements by one-half for the general lattice and by one-fourth for the constant impedance lattice while retaining the original characteristics of the network.

The performance of the differential amplifier and therefore of the network illustrated in FIG. 2 may be improved by having transistors 13 and 14 formed on the same semiconductor chip. This provides inherent matching of the base-to-emitter voltages and the short-circuit current gains of the two transistors. This results in excellent balance between the differential amplifier inputs in the face of changes in signal levels and ambient temperature.

What is claimed is:

1. An active lattice network comprising, a common terminal and an input terminal for connection to a source of input signal, a pair of output terminals, a differential amplifier having a pair of input ports and a pair of output ports, each of said input ports being connected to said input terminal through a respective resistance element corresponding to the terminating resistance of the network and to said common terminal through a respective impedance element having predetermined characteristics, said pair of output ports being respectively connected to said pair of output terminals.

2. An active lattice network as defined in claim 1 wherein said output terminals are respectively connected to said common terminal and one of said output ports.

3. An active lattice network as defined in claim 1 wherein said differential amplifier comprises a pair of transistors each having a base, emitter and collector electrodes, the base electrode of each transistor being connected to a respective one of said input ports, the emitter electrodes of the transistors being connected together and to said common terminal through a current source, the collector electrode of each transistor being connected to a source of voltage through a respective resistor and to a respective one of said pair of output ports.

4. An active lattice network as defined in claim 3 wherein said pair of transistors are on the same semiconductor chip.

* * * * *